United States Patent
Lin et al.

(10) Patent No.: US 6,405,256 B1
(45) Date of Patent: Jun. 11, 2002

(54) DATA STREAMING USING CACHING SERVERS WITH EXPANDABLE BUFFERS AND ADJUSTABLE RATE OF DATA TRANSMISSION TO ABSORB NETWORK CONGESTION

(75) Inventors: Chueng-Hsien Lin, Piscataway; Sanjoy Paul, Marlboro, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/282,236

(22) Filed: Mar. 31, 1999

(51) Int. Cl.[7] .............................. G06F 15/16
(52) U.S. Cl. .................. 709/231; 709/201; 709/203; 709/217; 709/218; 709/219; 709/232; 709/235; 709/238; 710/52; 710/56; 710/57; 710/60; 711/117; 711/118; 711/119
(58) Field of Search ................ 709/201, 203, 709/212, 216, 217, 218, 219, 231, 232, 235, 238; 711/117–119; 710/52, 56, 57, 60

(56) References Cited

U.S. PATENT DOCUMENTS

| | | | | |
|---|---|---|---|---|
| 4,752,897 A | * | 6/1988 | Zoeller et al. ............... 702/40 |
| 5,014,265 A | * | 5/1991 | Hahne et al. ............... 370/236 |
| 5,210,829 A | * | 5/1993 | Bitner ......................... 710/57 |
| 5,319,638 A | * | 6/1994 | Lin .............................. 370/235 |
| 5,671,445 A | * | 9/1997 | Gluyas et al. ............... 710/53 |
| 5,928,331 A | * | 7/1999 | Bushmitch ................. 709/231 |
| 5,968,120 A | * | 10/1999 | Guedalia ..................... 709/219 |
| 6,060,997 A | * | 5/2000 | Taubenheim et al. .. 340/825.44 |
| 6,112,276 A | * | 8/2000 | Wang ........................... 711/119 |
| 6,155,840 A | * | 12/2000 | Sallette ....................... 434/323 |
| 6,167,438 A | * | 12/2000 | Yates et al. ................. 709/216 |
| 6,195,680 B1 | * | 2/2001 | Goldszmidt et al. ........ 709/203 |
| 6,233,245 B1 | * | 5/2001 | Chapman et al. ........... 370/412 |

FOREIGN PATENT DOCUMENTS

EP 0658055 A1 * 6/1995

OTHER PUBLICATIONS

"Scalable Web Server Architectures", IEEE 1997.*
Milano, "Buffer Sizing for High Speed Video Information Retr5val9n ATM Network", IEEE 1997.*
"Directory Algorithm for Communcation peer Networks", IBM Technical Disclosure Bulletin, Mar. 1989.*

* cited by examiner

*Primary Examiner*—Zarni Maung
*Assistant Examiner*—Nabil El-Hady (57) ABSTRACT

A data streaming transmission method and system is disclosed having a network server connected to client device through a communication network with one or more of caching servers. The network server has a data streaming application and a memory for storing data. A series of connections, each using a data streaming arrangement, is formed in the path between the source network and client device by the caching servers. Each caching server can absorb network congestion in its downstream connection by utilizing an expandable buffer for storing additional segments of the streamed data and varying the transmission data rate in the down stream connection.

17 Claims, 6 Drawing Sheets

DATA STREAMING USING CACHING SERVERS WITH EXPANDABLE BUFFERS AND ADJUSTABLE RATE OF DATA TRANSMISSION TO ABSORB NETWORK CONGESTION

FIELD OF THE INVENTION

This invention relates generally to a system of data transmission between a network server and a remote user client device and, more particularly, to a system using data streaming to download or transfer large files (principally containing multimedia information) between the network server and the client device.

BACKGROUND OF THE INVENTION

Currently there are two prevalent methods of downloading multimedia (e.g. audio/video) data files on the Internet. The first method involves using Transmission Control Protocol/Internet Protocol (TCP/IP) to download or deliver an entire digital audio and/or digital video file from a source network server to a remote client device. The client device may be a personal computer equipped with an Internet browser and multimedia playback tools. Once the client device has received the entire file, the user can begin to view or play the audio/video data file locally. However, this method suffers from several limitations, the most important being the need for a very large buffer at the client device.

The second method uses a data streaming technique in which a large multimedia file (which might be three minutes long and may be tens of Mbytes large) on a network server is downloaded to a client device through a constantly flowing stream of data. The client device's play-out apparatus continuously decodes the audio/video streams and then plays them in real time, on demand. With data streaming, a small portion or "segment" of the data is sent to a client device and stored in a play-out buffer. This segment of data is then rendered (e.g. played, viewed and the like) almost instantaneously. While the client device renders the current segment of downloaded data, the steaming application simultaneously downloads new data to the client device's buffer. While the streaming technique thus avoids the need for a large buffer, because the data is downloaded on a segment by segment basis, there are still problems experienced by users as a result of network congestion.

Network congestion can be the result of a number of factors, some of which relate to the architecture of the telecommunications network and the arrangement of the network elements, such as the use of undedicated resources, e.g., shared routers, which must compete in a sometimes inefficient manner to effect file transfers and download multimedia streams to users. Congestion also occurs due to traffic on the Internet that has virtually exploded as a result of the overwhelming popularity of the World Wide Web (WWW). Further, network servers connected to the Internet are getting overloaded with other types of queries and information requests, including e-mails, internet telephony, etc.

The current data streaming approach can not adequately account for congestion in the network because, when congestion occurs, the network server cannot continue to effectively and rapidly download the multimedia files and thereby replenish the client device's play-out buffer before the buffer becomes empty. This is because only a single logical connection is formed between the network server and the client device for data streaming. When network congestion occurs in the connection, the rate at which data is received in the play-out buffer is slower than the rate at which it is extracted from the play-out buffer by the client device. Because the play-out buffer is only intended, with data streaming, to store segments of the multimedia file, the play-out buffer is usually not large enough to absorb the network congestion. In other words, the client device's play-out buffer will be depleted before the network congestion terminates which can lead to a freezing effect in the streaming applications. When such a freezing effect occurs, the user can experience a momentary and longer-lasting interruption to the multimedia playback experience, hence, the overall playback quality suffers.

From the foregoing, it is seen that although prior art arrangements for data streaming perform satisfactorily in some applications and under some circumstances, inadequacies such as congestion in the communication networks often adversely affect user perceptions of multimedia application performance. Consequently, there is a need to alleviate the problem caused by network congestion when multimedia files are downloaded from a network server to a network user using data streaming.

SUMMARY OF THE INVENTION

Multimedia playback is enhanced and the effects of network congestion are significantly reduced over the current art in data streaming arrangements by interposing at least one caching server within a communication network, in the communication path between a network server and a network user's client device. The caching server(s) in the communication path forms a level or series of levels of caching servers, with level one starting from the caching server nearest the network server and proceeding downstream to level N nearest the client device. As a result, a series of individual logical connections are formed in the communication path, such as (1) the connection between the network server and the level one caching server and (2) the connection between the level N caching server and the client device. In addition, each caching server is arranged to determine whether network congestion exists in the downstream connection of that particular caching server and, if so, to absorb it. To absorb network congestion, each caching server is equipped with an expandable buffer and an arrangement to vary the rate at which data is sent downstream from a particular caching server that experiences congestion in its downstream connection to the next caching server or to the client device.

In operation, a two-phase caching technique is utilized (1) an initialization phase to reduce response time and provide a start-up sequence of data segments closer to the client device and (2) a steady-state phase to continuously stream data segments to the client device. In the initialization phase, a client device requests data located in the network server. The network server can receive the request in a variety of ways, including directly from the client device or from the caching servers in the communication network. In response, the network server segments the requested data and transmits a start-up sequence of data segments to the appropriate caching servers and/or client device, for example, each of the appropriate caching servers and the client device may receive and store one initial data segment. During the initialization phase the present invention allows data to be transmitted and accumulated in servers nearer to the client device than would occur in conventional arrangements.

In the steady-state phase, the start-up data segments that now have been stored are continuously streamed, at a first data rate, through the one or more caching servers and then to the client device to allow a constant multimedia playback performance at the client device. As the client device depletes the initial data segment in its buffer, the client device is replenished with a new data segment by the nearest caching server, and the nearest caching sever is replenished with a new data segment from the next upstream caching server, and so on.

If network congestion should occur during the steady-state phase, each caching server is equipped to absorb the network congestion in its downstream connection. In particular, each caching server periodically determines whether network congestion exists in its downstream connection, and if network congestion exists, the caching server: (1) decreases the data transfer rate from the first data rate to a slower second data rate so that data is not lost due to the congestion and (2) increases the size of its expandable buffer to accommodate additional data segments received from its upstream caching server. When the network congestion subsides or terminates, the caching server (1) increases the data transfer rate, for example, to a third data rate faster than the first data rate to quickly replenish the downstream caching server with new data segments, and (2) decreases the size of its expandable buffer as the additional data segments are depleted. In this manner, the system and method of the present invention improves the performance of data streaming by reducing the freezing effect in the client device, which may result from network congestion in the current single connection streaming approach.

BRIEF DESCRIPTION OF THE DRAWING

The invention will be more fully understood from the following detailed description of an illustrative embodiment taken in connection with the appended figures in which.

DETAILED DESCRIPTION

During the course of this description, like numbers will be used to indicate like elements within the different figures that illustrate the invention.

Figure 1:
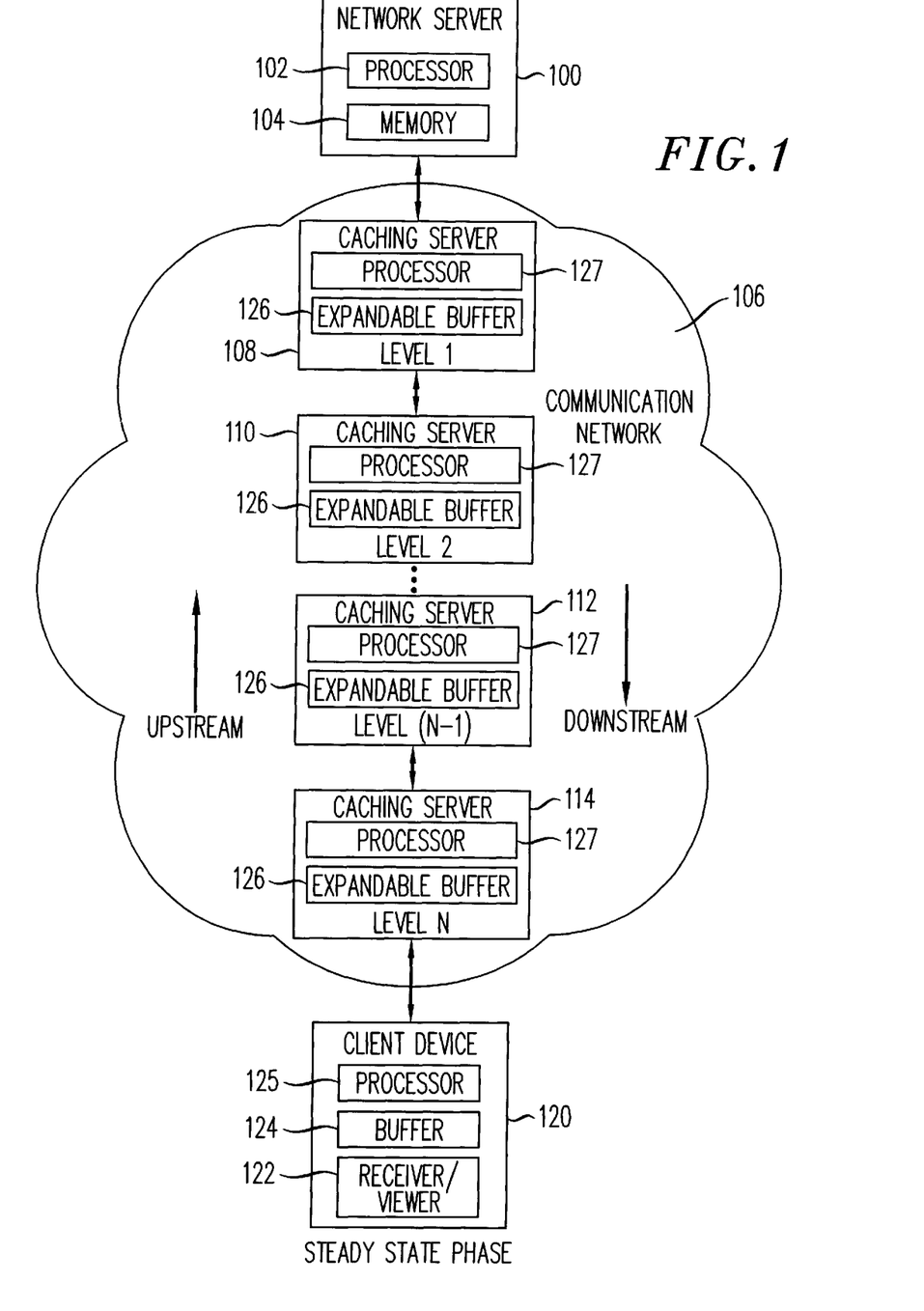
FIG. 1 shows a steady-state block diagram of one illustrative embodiment of the data transmission system in accordance with the principles of the present invention.

In accordance with the principles of the present invention, FIG. 1 shows a steady-state schematic diagram of the data streaming architecture to facilitate data transmission and, in particular, efficiently stream or transfer data on a real-time basis. The illustrated system comprises a network server 100, a plurality of caching servers 108, 110, 112 and 114, which are part of a communication network 106 and a remote user client device 120. The caching servers are organized in "levels", with the caching server nearest network server 100 being level one and the caching server nearest client device 120 being the last or Nth level. The connections between the servers can be physical connections, i.e. hard-wired, or logical connections, such as an Internet connection. Furthermore, information traveling in the direction from the network server toward the client device is hereafter referred to as "downstream", while information traveling in the opposite direction is hereafter referred to as "upstream". Network server 100 has a memory 104 for storing data, and a processor 102 to facilitate transmission of data via a data streaming server application with the functionality shown in FIG. 3. The data stored in memory 104 may have an encoded video and audio data file representing a typical movie that may be transmitted via communication network 106 to remote user client device 120. Remote user client device 120, for example a personal computer, includes a buffer 124, a processor 125 with a data streaming client application and a receiver/viewer 122. Processor 125 also includes a data requesting device, which can be any conventional method of requesting data from a network server, such as using an Internet browser to click on a web page data source, an email message, and the like. The receiver/viewer 122 is any conventional video/audio playback device.

The illustrative embodiment of the present invention described herein focuses on data streaming in global, worldwide networks, such as the Internet. Those skilled in the art will recognize, however, that the present invention will be applicable to a wide variety of data networks and applications. Likewise, although the invention may be particularly well suited for data request/delivery over the Internet using User Datagram Protocol (UDP), the invention is not limited to use with any particular network communication protocol.

Caching servers 108, 110, 112 and 114 are interconnected within communication network 106. Each caching server includes a processor 127 to facilitate data transmission via a data streaming server application with the functionality shown in FIG. 4 and an expandable buffer 126. As will be understood by persons skilled in the art, each caching server may be designed by adapting a conventional data-processing/routing means that can process data segments with a data streaming server application with the functionality described in FIG. 4 and an expandable buffer.

In order to provide the expandable buffer, a caching server equipped with a predetermined size memory can designate a portion of the memory as a single expandable buffer and use the remaining memory for other purposes. Alternatively, each caching server can allocate a portion of the predetermined memory among several smaller expandable buffers. The memory of the caching server may include both disk memory and random access memory (RAM). Each caching server can accommodate one data streaming transaction for each configured expandable buffer. The type of caching server used determines the number of expandable buffers and, thereby, the number of transactions. For example, if the total memory size for a particular caching server is 150 Mbytes, and each expandable buffer is initially allocated 10 Mbytes, the number of expandable buffers that the caching server can configure is any number less than or equal to fifteen. The configured expandable buffers can grow, if needed, to absorb network congestion in the caching server's downstream connection in a number ways, including using the unallocated memory and/or borrowing memory from configured expandable buffers.

As noted above, data streaming systems that facilitate the real-time data transfer in a connection between a network server and client device (remote user terminal) are well known in the art. Such a system forms a single logical connection in the communication network between the network server and the client device, which may comprise many physical connections through routers, and the like, in the communication network.

However, in contrast to conventional data streaming systems that transmit data in a logical connection directly between a network server and a client device, the present invention's use of multiple levels of caching servers between the network server and the client device form a series of logical connections that in turn form the total path between a network server and a client device. Data transfers between the respective caching servers, the client device, and the network server may be accomplished using any conventional method applicable to communication networks. For example, data transfers in each connection may use data streaming or Real-Time Transport Protocol/User Datagram Protocol/Internet Protocol (RTP/UDP/IP).

Although data segments are streamed through the series of connections, each connection supports an independent data stream. As a result, each server (e.g., network server and caching server) is only concerned with streaming data to its nearest downstream device. Thus, each caching server and client device only needs to know the location of its nearest upstream caching server in the communication network, for example, the IP address on the Internet, to send data requests to. Therefore, additional addressing or routing headers on the data segments are not needed, even though the segments are streamed from the network server through the caching servers and ultimately to the client device.

Figure 5:
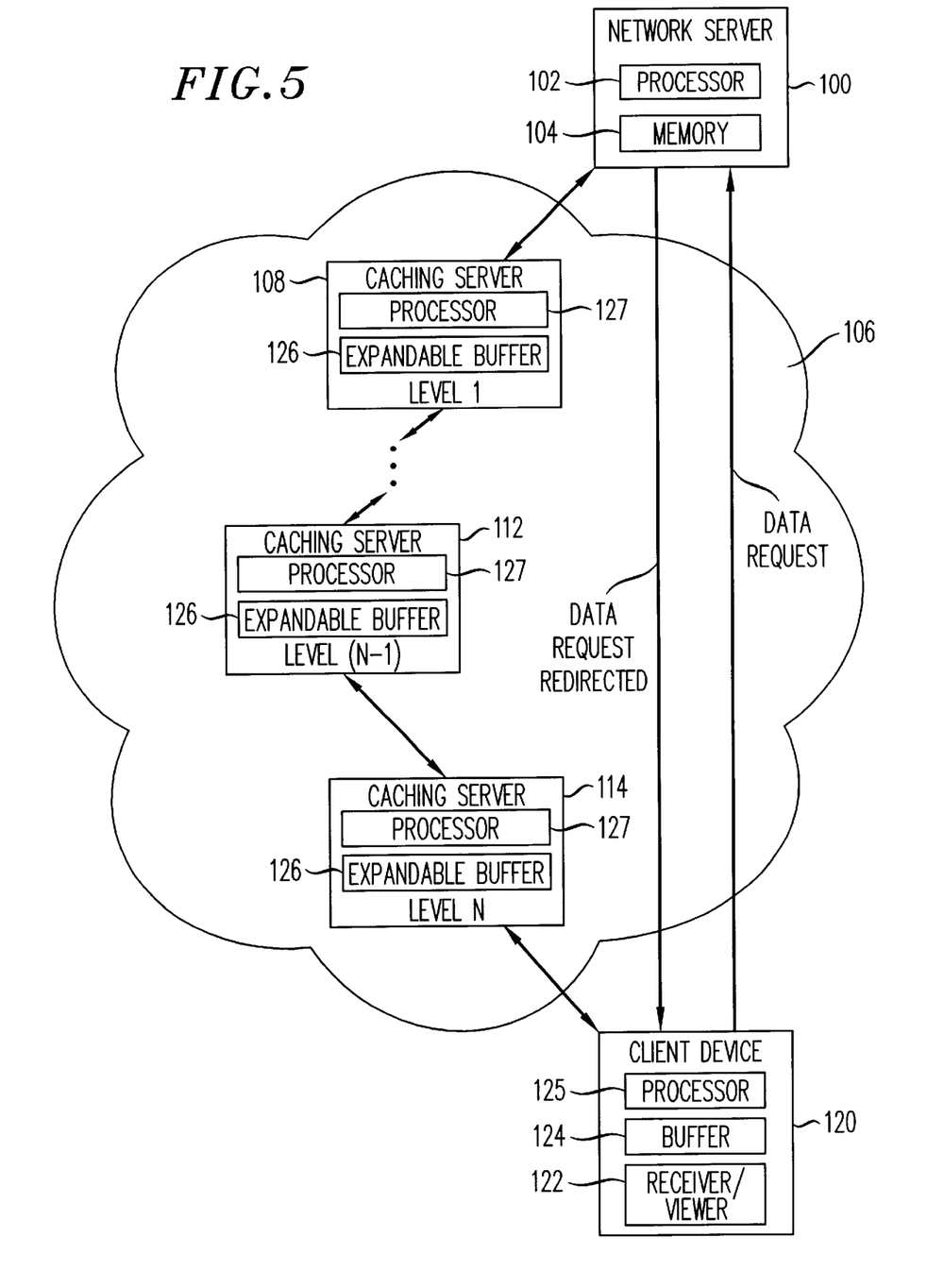
FIGS. 5 and 6 show block diagrams of one aspect of the data transmission system operation in accordance with the principles of the present invention.

Utilization of multiple caching server levels in the communication network can be accomplished in a variety of ways. By "utilization" we mean both downstream data transfers and upstream data requests. In one method explained in conjunction with FIG. 5, client device 120 learns the location of its nearest or upstream caching server in the communication network after making a data request to network server 100. Network server 100 redirects the client device's data request back to the client device with the location of a particular caching server 114. Caching server 114 is configured to point to another upstream caching server 112, and so on, until network server 100 is reached. For example, UUNET maintains a managed and widely deployed network, with more than 1,000 Points of Presence (POPs) around the world. The U.S. backbone network has ATM "metro rings" in 10 metropolitan multi-hub areas. These locations include Seattle, Los Angeles, Dallas, Houston, Chicago, Boston, Atlanta, New York City, Washington, D.C., and the San Francisco Bay area. Thus, caching servers may be co-located or incorporated in the hub servers of such a network and network servers could then redirect data requests to the caching server nearest to the location of the client device (e.g., New York City).

In a second method, the client device may be configured to point to a particular caching server, for example, by configuring a proxy in the client device, and the first caching servers may also be configured to point to a second caching server. Accordingly, the client device sends data requests to the first caching server and first caching server sends the data request to the second caching server, and so on, until the network server is reached. For example in FIG. 1, client device 120 knows the location of the level N caching server 114 and the level N caching server 114 knows the location of the level N−1 caching server 112, and so on.

Figure 6:
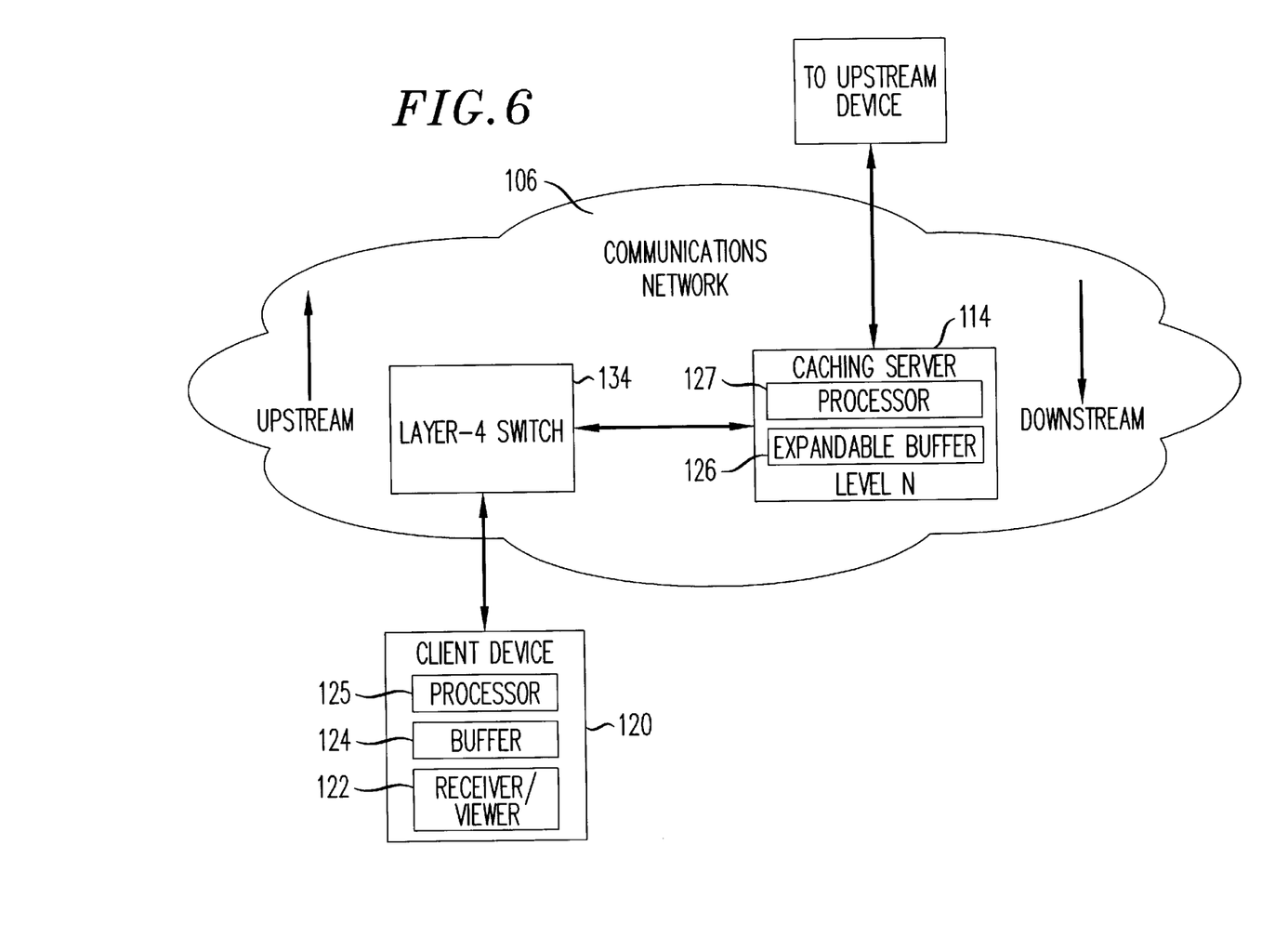

Still another method of utilizing the caching servers is best illustrated when explained in conjunction with FIG. 6. The process begins when client device 120 sends a request for data to network server 100. After client device 120 sends the request, a conventional Layer-4 switch 134 intercepts the request and forwards it to the appropriate caching server, for example, caching server 114 in FIG. 6. Layer-4 switch 134 is a router that can route data packets based on a port number protocol type and/or IP address, such as an Internet HTTP port number. The caching server responds to the request such that client device 120 can not distinguish between a response coming from the caching server and a response coming from network server 100.

Layer-4 switch 134 utilizes the fourth, or transport, layer information to determine the request's destination. The transport layer includes Internet Protocol (IP) header information with a source port and a destination port, and User Datagram Protocol (UDP)/Transmission Control Protocol/Internet Protocol (TCP/IP) header information with a source port and a destination port. The layer-4 switch traps the client device's requests for data sent to the network server by utilizing the transport layer's UDP/TCP destination port information. The UDP/TCP destination port information, together with the IP address, indicates the network server that the client device is attempting to download data from.

Lastly, this destination port information could also indicate whether the particular network server is configured for data streaming. Thus, if the network server is configured for data streaming, an initialization phase would begin and the layer-4 switch would then route data segment requests from the client device to the appropriate caching server. Otherwise, the data file would be downloaded in a conventional manner from the network server.

In operation, a two-phase caching technique is utilized. First, an initialization phase is used to reduce response time by accumulating data segment in caching servers nearer to the client device, thus providing a start-up sequence of data segments and second, a steady-state phase is used to continuously stream data segments to the client device.

A client device interested in getting certain data stored in a network server, signals its request in a message directed to the network server to initiate the transmission of the selected data file from memory 104 in a data streaming manner. The signaling or request by the client device may be any conventional method, for example, clicking on a web link which may use Real-Time Streaming Protocol (RTSP, e.g. RFC 2326). Accordingly, when the network server receives a request for particular data in its memory, the network server enters into a data streaming initialization phase with the caching servers and the client device.

Figure 2:
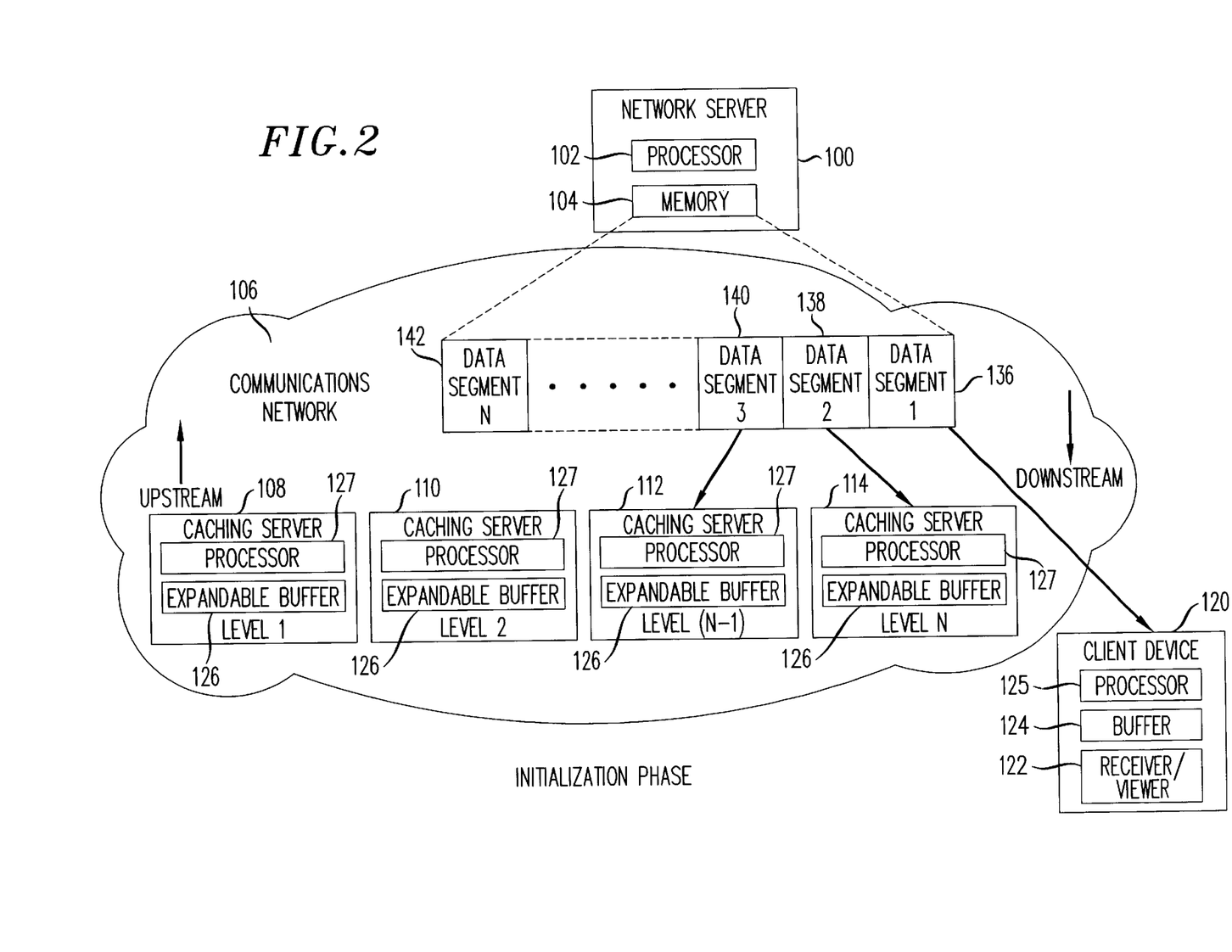
FIG. 2 shows an initialization phase block diagram of one illustrative embodiment of the data transmission system in accordance with the principles of the present invention.
Figure 3:
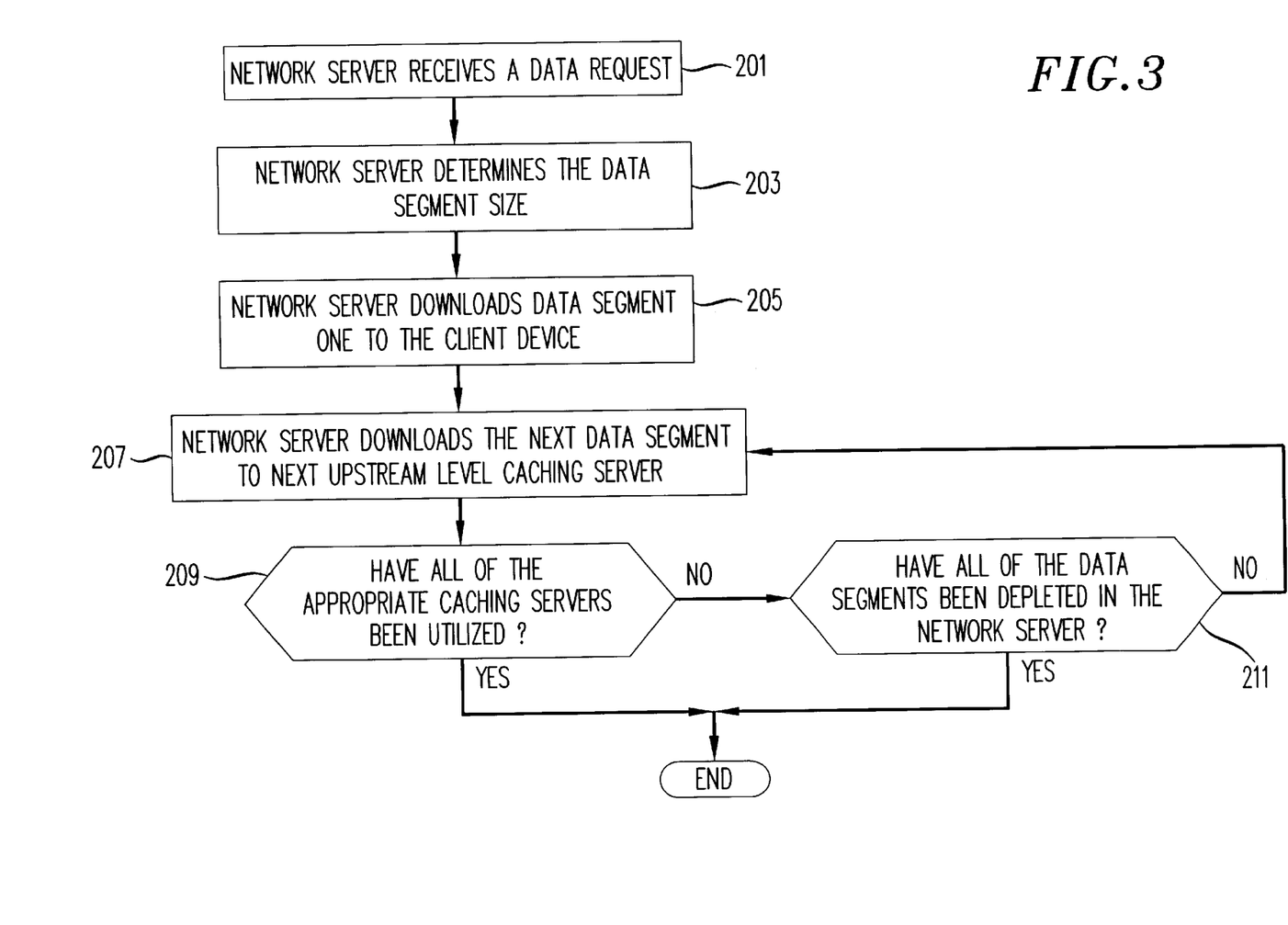
FIG. 3 is a flowchart illustrating the operation of the initialization phase of the system depicted in FIG. 2.

FIGS. 2 and 3 show operation of one exemplary embodiment of the invention during the initialization phase. The process begins with the network server receiving a data request in step 201 of FIG. 3. Thereafter, in step 203, the network server determines the data segment size for the requested data. A data segment is a logical unit that is dependent on the type of client device used and the size of the buffer therein. Specifically, the size of a segment is based on the buffer capacity the client device is expected to have. For example, if the particular client device typically has a buffer size of 1 Mbyte, and the video frame size is 8 Kbytes, then the segment size will be 125 frames. The appropriate caching servers and sequence of caching servers utilized is determined by one of the above described methods, which may be based on any of the following factors: physical location of the caching servers, transaction (or traffic) load of the caching servers, potential costs related to the caching servers and availability of the caching servers.

In step 205 of FIG. 3, the network server downloads data segment one to the client device. Next, the network server downloads the next data segment to the next upstream level caching server from the client device and this continues until all of the appropriate caching servers have been utilized or all of the data segments in the network server have been depleted. These processes are accomplished in steps 207, 209, and 211.

Advantageously, during the initialization phase, the network server can either open parallel connections to download data segments to the client device and caching servers concurrently or sequential connections to download data segments one at a time.

Variations of the initialization phase are possible. For example, instead of sending data segment one to the client device, the entire data file (all data segments) may be downloaded to a single caching server. The caching server stores the data segments in the expandable buffer utilizing, for example, both disk memory and RAM of the caching server, depending on the size of the data file.

With reference now to FIG. 2, during the initialization phase, network server 100 illustratively downloads data segment one (designated by reference number 136 in FIG. 2) stored in memory 104 to client device 120, which is stored in buffer 124. Next, network server 100 transfers subsequent data segments to the appropriate caching servers. Thus, network server 100 sends data segment two (designated by reference number 138 in FIG. 2) to caching server 114 (level N), which stores that data segment in expandable buffer 126. Similarly, data segment three (designated by reference number 140 in FIG. 2) is transferred to caching server 112 (level (N−1)). This process continues until all of the requested data segments from memory 104 are either depleted or all of the appropriate caching servers available to the network server are utilized.

If the total initial expandable buffer size of the caching servers available to the network server is greater than the total size of the requested data from the network server, then all of the data segments will be depleted or downloaded in the initialization phase. Otherwise, the caching servers together will contain a part of the total data at any instant of time and the server will store the remaining data segments. The server would then stream the remaining data segments to the caching servers, and ultimately the client device, during the steady-state phase described below. For example, in FIG. 2, the data segments will be depleted during the initialization phase if: (1) the data segments are 1 Mbyte in size, (2) the data stored in the network server is 2 Mbytes in size, (3) there are three available caching server levels (for example, caching servers 110, 112, and 114 in FIG. 2) in the communication network, and (4) each caching server has a 1 Mbyte size expandable buffer. Specifically, the first 1 Mbyte data segment will be transferred to the client device and the second 1 Mbyte data segment will be transferred to the Nth or last level caching server, i.e., caching sever 114 in FIG. 2, thereby depleting the data segments in the network server. In a further example, all of the caching servers available to the network server will be utilized during the initialization phase if: (1) the data segments are 1 Mbyte in size, (2) the data stored in network server is 3 Mbytes in size, (3) there is one available caching server level (for example caching server 114 in FIG. 2) in the communication network and (4) the caching server has a 1 Mbyte size expandable buffer. Specifically, the first 1 Mbyte data segment will be transferred to the client device and the second 1 Mbyte data segment will be transferred to the caching server and the remaining data segment will remain in the network server.

After the initialization phase, the steady-state phase of operation begins, as shown in FIG. 1. Client device 120 proceeds to process data segment one, for example, playing the video and audio data segment on receiver/viewer 122. When client device 120 begins to process data segment one, it also sends a request signal to the appropriate upstream caching server requesting the data segment two. The appropriate upstream caching server (hereafter "upstream caching server") was determined by server 100 during the initialization phase. Illustratively in FIG. 1, client device 120 sends a request signal to caching server 114 (level N), requesting the data segment two. Concurrently, caching server 114 (level N) sends a request signal to its upstream caching server 112 (level (N−1)) requesting the data segment three, and caching server 112 (level N−1) sends a request signal to its upstream caching server 110 (level 2) requesting the data segment four, and so on, until caching server 108 (level 1) is reached. When caching server 108 (level 1) is reached, caching server 108 does not generate a request signal if all of the data segments have been depleted in the initialization phase. Otherwise, caching server 108 sends a request to network server 100 for a data segment. Thereafter, the respective data segments are transferred to the respective downstream caching servers or client device. For example, caching server 112 transfers the data segment stored therein to caching server 114, and caching server 114 transfers the data segment stored therein to client device 120. This process continues until all of the respective data segments in the caching servers and/or network server are depleted and rendered by the client device.

Figure 4:
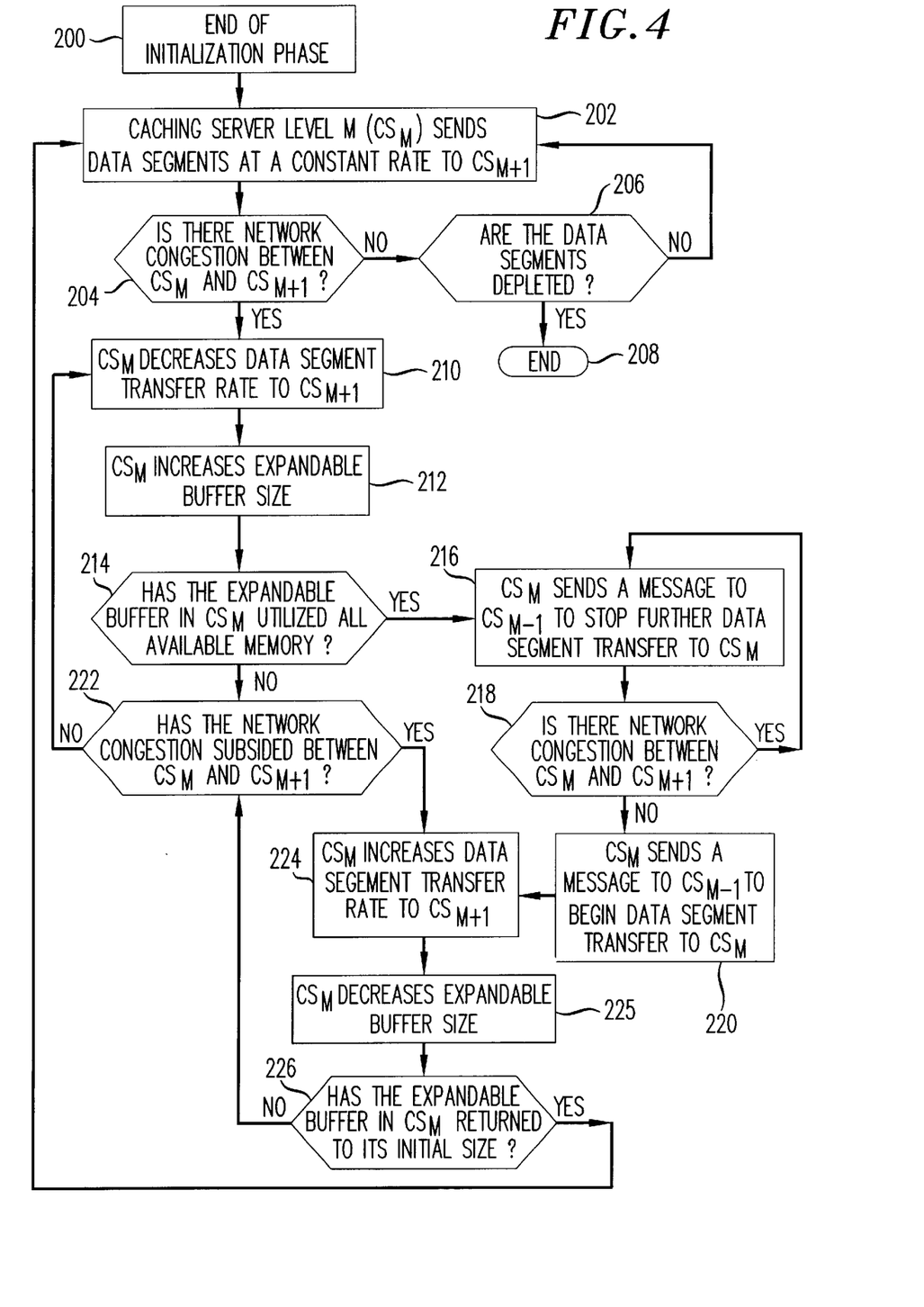
FIG. 4 is a flowchart illustrating the operation of the system depicted in FIG. 1.

Illustratively, FIG. 4 shows the operation of a three caching server portion of the system depicted in FIG. 1, where the three caching servers are labeled $CS_{M+1}$, $CS_M$ and $CS_{M-1}$ and where data flows from $CS_{M+1}$ to $CS_M$ to $CS_{M-1}$. For simplicity, one data streaming transaction will be described. Each caching server operates in a similar manner. After the initialization phase has completed, shown by step 200, the data streaming commences at a first data rate from caching server level M ($CS_M$), where M is an integer from 1 to N, to the downstream caching server level M+1 ($CS_{M+1}$), as shown by step 202. Periodically, in step 204, $CS_M$ checks for network congestion in the connection between $CS_M$ and $CS_{M+1}$. This may be accomplished, for example, by the downstream $CS_{M+1}$ or client device sending a packet loss rate to $CS_M$, which then compares the received packet loss rate to a predetermined packet loss rate corresponding to congestion in the network (hereafter known as the "congestion packet loss rate"). Commercially available protocols and software, such as RTP/RTCP, can provide packet loss rates. If the received packet loss rate by $CS_M$ is greater than the congestion packet loss rate, there is network congestion in that connection of the network between $CS_M$ and $CS_{M+1}$; otherwise, there is no network congestion therebetween.

In the situation where network congestion does not exist, data segments are continuously streamed through the caching servers to the client device until the data file has been depleted, as represented in steps 206, 202, 204, and 208. When a connection in the path between the network server and client device is experiencing network congestion, for example, between $CS_M$ and $CS_{M+1}$, the invention provides two measures to reduce the problems associated with the network congestion. One, the first data rate from $CS_M$ to the downstream $CS_{M+1}$ is decreased to a second data rate. Two, the expandable buffer in $CS_M$ is increased. The expandable buffer may be increased in a number of ways, including incremental increases, using available portions of the excess memory as allocated in the caching server or borrowing memory from other configured expandable buffers in that caching server. Steps 210 and 212 represent these two measures.

After the expandable buffer has been increased, a check is performed to determine whether all of the excess or available memory in the particular caching server, $CS_M$, has been utilized, as shown in step 216. If the expandable buffer has used all of the excess or available memory in $CS_M$, a message or indication is sent to the upstream device, for example, caching server level M−1(hereafter $CS_{M-1}$) to cease further data segment streaming, as depicted in step 216. Similarly, the upstream device could be the network server. Thereafter, $CS_M$ periodically checks for network congestion between $CS_M$ and $CS_{M+1}$ in step 218. If network congestion exists in the connection between the $CS_M$ and $CS_{M+1}$, $CS_M$ continues in a non-data segment receiving mode and returns to step 216. If network congestion does not exist, a message or indication is sent to $CS_{M-1}$ to begin data segment streaming again, as indicated in step 220. Further, $CS_M$ increases the data rate transfer to $CS_{M+1}$, and $CS_M$ decreases its expandable buffer size, as shown in step 224 and 225. The rate increase can be back to the first rate or to an even higher third rate.

Returning to step 214, if the expandable buffer has not used all of the excess or available memory in $CS_M$, $CS_M$ checks whether the network congestion in the connection between $CS_M$ and $CS_{M+1}$ has subsided in step 222. If the network congestion in the connection has subsided or has been terminated, $CS_M$ increases the existing rate to $CS_{M+1}$, for example, to the higher third data rate or a fourth data rate as shown in step 224. If network congestion in the connection has not subsided, $C_M$ returns to step 210.

In step 226, $C_M$ determines whether its expandable buffer has returned to the expandable buffer's initial size. If the expandable buffer in $C_M$ has returned to its initial size, $C_M$ returns to step 202, if not, $C_M$ returns to step 222.

Finally, it is to be understood that although the invention is disclosed herein in the context of particular illustrative embodiments, those skilled in the art will be able to devise numerous alternative arrangements. Such alternative arrangements, although not explicitly shown or described herein, embody the principles of the present invention and are thus within its spirit and scope.

We claim:

1. A data transmission system comprising:
    a server, including a memory for storing data and means responsive to a request for said data for transmitting said data at a first data rate;
    a client device, including means for requesting said data and means for storing said data, and
    a communication network providing a communication path between said server and said client device,
    said communication network including,
        at least one caching server in said communication path, wherein said at least one caching server subdivides said communication path into a series of connections,
        said at least one caching server including,
            a buffer for storing said data,
            means for transmitting said data,
            a processor responsive to a determination that network congestion exists in one of said series of connections, for transmitting said data at a second data rate that is less than said first data rate in said one of said series of connections and for increasing the size of said buffer,
            said processor responsive to a subsidence of said network congestion in said one of said series of connections for transmitting said data at a third data rate and for decreasing the size of said buffer, wherein said third data rate is greater than said second data rate, and
        wherein said means for transmitting said data in said server and in said at least one caching server is a data streaming application.

2. The system of claim 1, wherein said third data rate is greater than said first data rate.

3. The system of claim 1, wherein said one of said connections is the connection directly downstream of said at least one caching server.

4. The system of claim 3, wherein said server, responsive to said request for said data, further includes,
    segmenting said data into data segments,
    transmitting consecutive ones of said data segments starting with said client device and then to said at least one caching server.

5. The system of claim 4, wherein said server transmits said consecutive ones of said data segments from one transmission method selected from either serial transmission or parallel transmission.

6. The system of claim 1, wherein said means for requesting said data in said client device and in said at least one caching servers is RTSP signaling.

7. The system of claim 6, wherein said communication network is the Internet.

8. The system of claim 7, wherein said system further includes means for said client device to determining the location of said at least one caching server within said communication network.

9. The system of claim 8, wherein said means for determining the location of said at least one caching server is a layer-4 switch.

10. The system of claim 9, wherein said data represents a video signal.

11. The system of claim 10, wherein said data represents an audio signal.

12. A caching server for use within a communications network, wherein data is streamed from a first device by means of transmitting data to a second device through a connection including said caching server, said caching server comprising:
    means for receiving data from a first device;
    a buffer for storing said data;
    a data steaming means for transmitting said data to a second device at a first data rate; and
    a processor responsive to the determination that network congestion exists in said connection between said first device and said second device for transmitting said data to said second device at a second data rate that is less than said first data rate and for increasing the size of said buffer,
    said processor responsive to a subsidence of said network congestion for transmitting said data to said second device at a third data rate that is greater than said second data rate and for decreasing the size of said buffer, and
    wherein said means for transmitting said data in said first device and in said caching server is a data streaming application.

13. The caching server of claim 12, wherein said third data rate is greater than said first data rate.

14. A method of transmitting data from a server to a client device through a connection in a communication network, said connection including at least one caching server, said method comprising the steps of:
    at said client device, requesting data from said server;
    at said server, transmitting said data through said connection at a first data rate;

at said at least one caching server, buffering said data in a buffer;

responsive to network congestion in said connection, increasing the size of said buffer and transmitting said data at a second data rate that is less than said first data rate; and responsive to a subsidence of said network congestion, decreasing the size of said buffer and transmitting said data at a third data rate, wherein said third data rate is greater than said first data rate, and wherein the steps of transmitting said data at said server and at said at least one caching server comprise data streaming.

15. The method of claim 14, wherein the step responsive to said request for said data at said server further includes, segmenting said data into data segments;

consecutively transmitting one of said data segments to said client device and then said at least one caching server.

16. A method of streaming data within a communications network, wherein data is streamed from a first device by means of transmitting data to a second device through a series of connections, said method comprising the steps of receiving data from said first device;

storing said data in a buffer;

transmitting said data to a second device at a first data rate;

determining whether network congestion exists within a connection of said series of connections between said first device and said second device;

responsive to network congestion in said increasing the size of said buffer and transmitting said data at a second data rate to said second device, wherein said second data rate is less than said first data rate; and responsive to a subsidence of said network congestion in said connection, decreasing the size of said buffer and transmitting said data at a third data rate that is greater than said second data rate to said second device, and wherein the steps of transmitting said data to said second device and from said first device comprise data streaming.

17. The method of claim 16, wherein said third data rate is greater than said first data rate.

* * * * *